(12) United States Patent
Coogle

(10) Patent No.: US 7,740,027 B1
(45) Date of Patent: Jun. 22, 2010

(54) REFRIGERATION CONDENSATE TRAY TREATMENT APPARATUS

(76) Inventor: Gregory Coogle, 492 NW. 162 Ave., Pembroke Pines, FL (US) 33028

( * ) Notice: Subject to any disclaimer, the term of this patent is extended or adjusted under 35 U.S.C. 154(b) by 539 days.

(21) Appl. No.: 11/788,308

(22) Filed: Apr. 19, 2007

Related U.S. Application Data

(63) Continuation-in-part of application No. 10/982,573, filed on Nov. 5, 2004, now abandoned.

(51) Int. Cl.
*B01D 11/02* (2006.01)
(52) U.S. Cl. .................................... 137/558; 137/268
(58) Field of Classification Search ............. 137/268, 137/558, 398, 409, 412; 422/264, 275–277; 210/198.1
See application file for complete search history.

(56) References Cited

U.S. PATENT DOCUMENTS

| | | | | |
|---|---|---|---|---|
| 2,955,028 | A * | 10/1960 | Bevans | 137/268 |
| 3,872,879 | A * | 3/1975 | Green | 137/268 |
| 7,191,649 | B1 * | 3/2007 | Coogle | 73/313 |
| 7,389,651 | B2 * | 6/2008 | Cantolino | 62/303 |

* cited by examiner

*Primary Examiner*—Kevin L Lee
(74) *Attorney, Agent, or Firm*—Alvin S. Blum

(57) ABSTRACT

Apparatus applies chemicals to water in an air conditioning condensate tray. It has an elongate reservoir body with an open upper end, a closed lower end, and a central cavity enclosed by an encircling wall. The central cavity receives chemicals to prevent the growth of microorganisms. A closure closes the central cavity. A tubular member is operatively connected at a first end to an aperture in the wall, and has a second end extending outwardly therefrom. The second end is constructed for receiving condensate water from the condensate tray, providing a fluid passage to the central cavity in a first mode of operation when water in the condensate tray is above a preset level; and for dispensing water to the tray from the central cavity in a second mode of operation with chemicals disposed in the water from contact within the central cavity.

19 Claims, 4 Drawing Sheets

REFRIGERATION CONDENSATE TRAY TREATMENT APPARATUS

This application is a continuation-in-part of utility patent application Ser. No. 10/982,573 filed Nov. 5, 2004, now abandoned, incorporated herein by reference.

FIELD OF THE INVENTION

This invention relates generally to refrigeration systems, and more particularly to an apparatus for the chemical treatment of water in the condensate tray beneath the evaporator of an air conditioning unit.

BACKGROUND OF THE INVENTION

It is well known in the art to provide a receptacle such as a tray or pan beneath the evaporator coils of an air conditioner to receive water that condenses from the air as it is cooled. A drain pipe is generally connected to a side wall of the tray to drain the condensate water as it accumulates. Because water may stand still in the system, various microorganisms may grow in the tray and drain pipe until they clog up the drainage system. When this occurs, overflowing water may cause considerable damage. Because the drainage system and tray are out of sight and may be relatively inaccessible, they may be neglected until damage occurs. Various methods of applying antimicrobials to the drainage systems have been employed in the prior art. They have not been completely successful in overcoming the problem.

SUMMARY OF THE INVENTION

It is accordingly an object of the invention to provide a system that applies biocidal chemicals to a condensate tray and then to a drainage system that does not require access to the tray to replace the chemicals. It is another object of the invention that movement of water over the chemicals is greatly reduced compared to prior art systems to prevent the rapid elution of the chemicals. Apparatus of the invention applies chemicals to water in an air conditioning condensate tray. It has an elongate reservoir body with an open upper end, a closed lower end, and a central cavity enclosed by an encircling wall. The central cavity receives chemicals to prevent the growth of microorganisms. A top closure removably closes the central cavity. A tubular member is operatively connected at a first end to an aperture in the encircling wall, and has a second end extending outwardly therefrom. The second end is constructed for receiving condensate water from the condensate tray for providing a fluid passage for the water to the central cavity in a first mode of operation when water in the condensate tray is above a preset level until water in the central cavity reaches the same level. It dispenses water to the tray from the central cavity in a second mode of operation with chemicals disposed in the water from contact within the central cavity when the level in the tray falls.

These and other objects, features, and advantages of the invention will become more apparent from the detailed description of an exemplary embodiment thereof as illustrated in the accompanying drawings, in which like elements are designated by like reference characters in the various drawing figures.

DETAILED DESCRIPTION OF PREFERRED EMBODIMENTS

Figure 1:
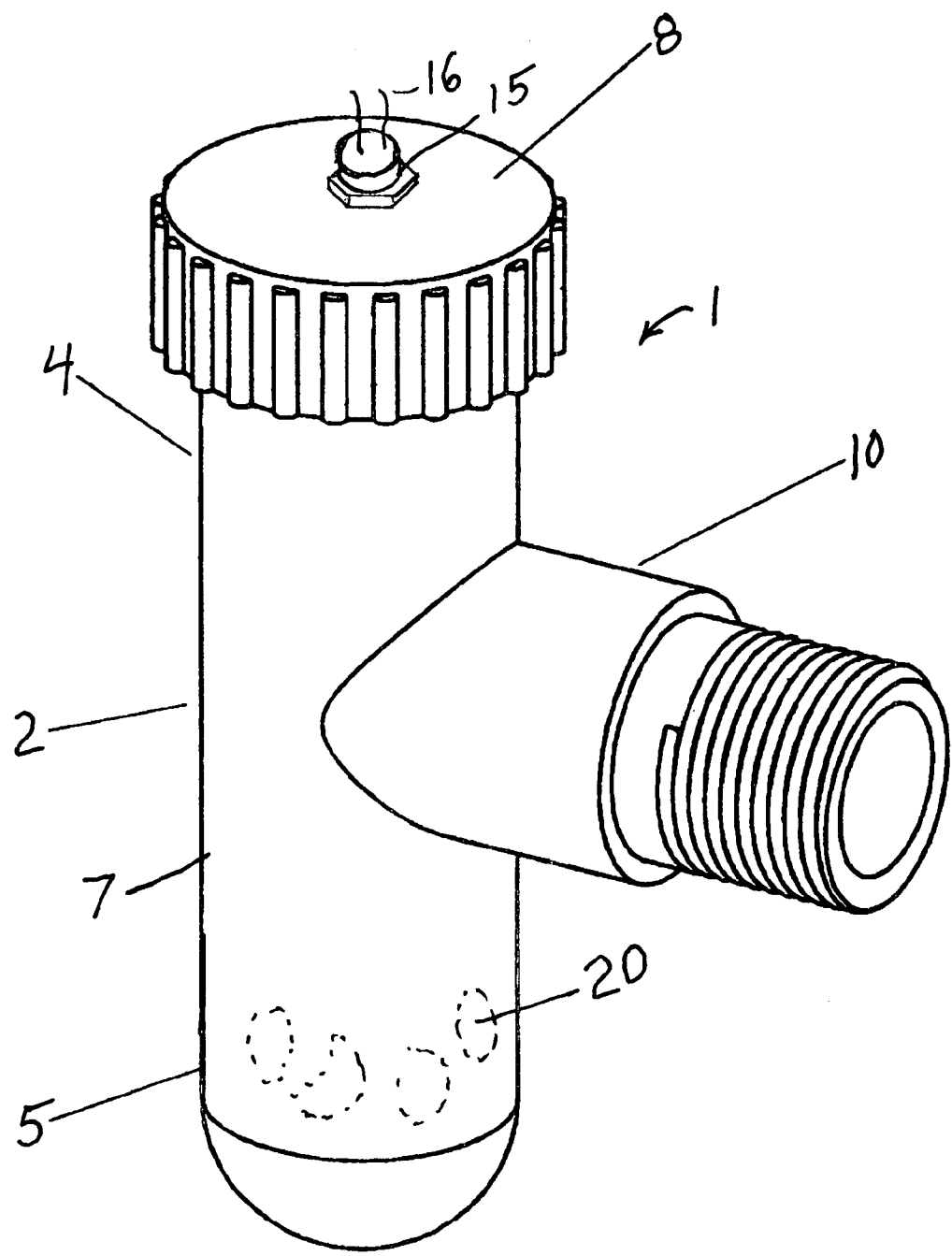
FIG. 1 is a perspective view of the apparatus of the invention.
Figure 2:
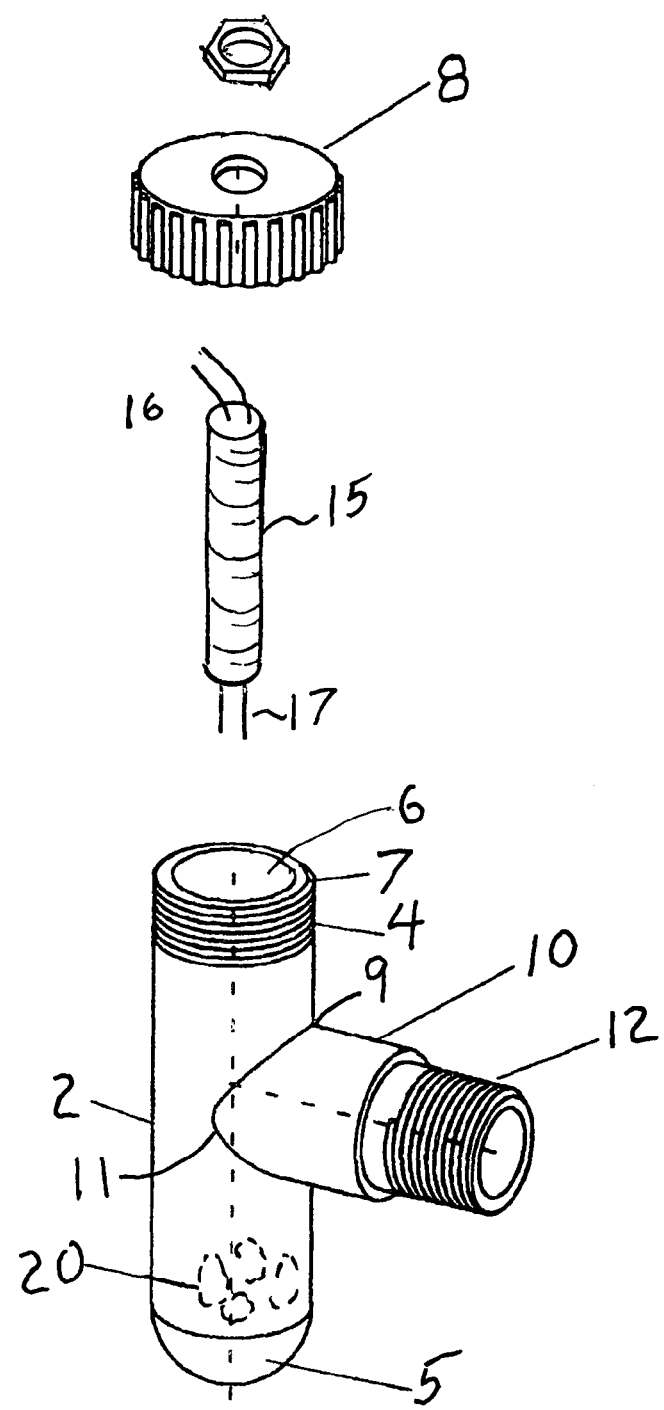
FIG. 2 is an exploded view of the invention of FIG. 1.
Figure 3:
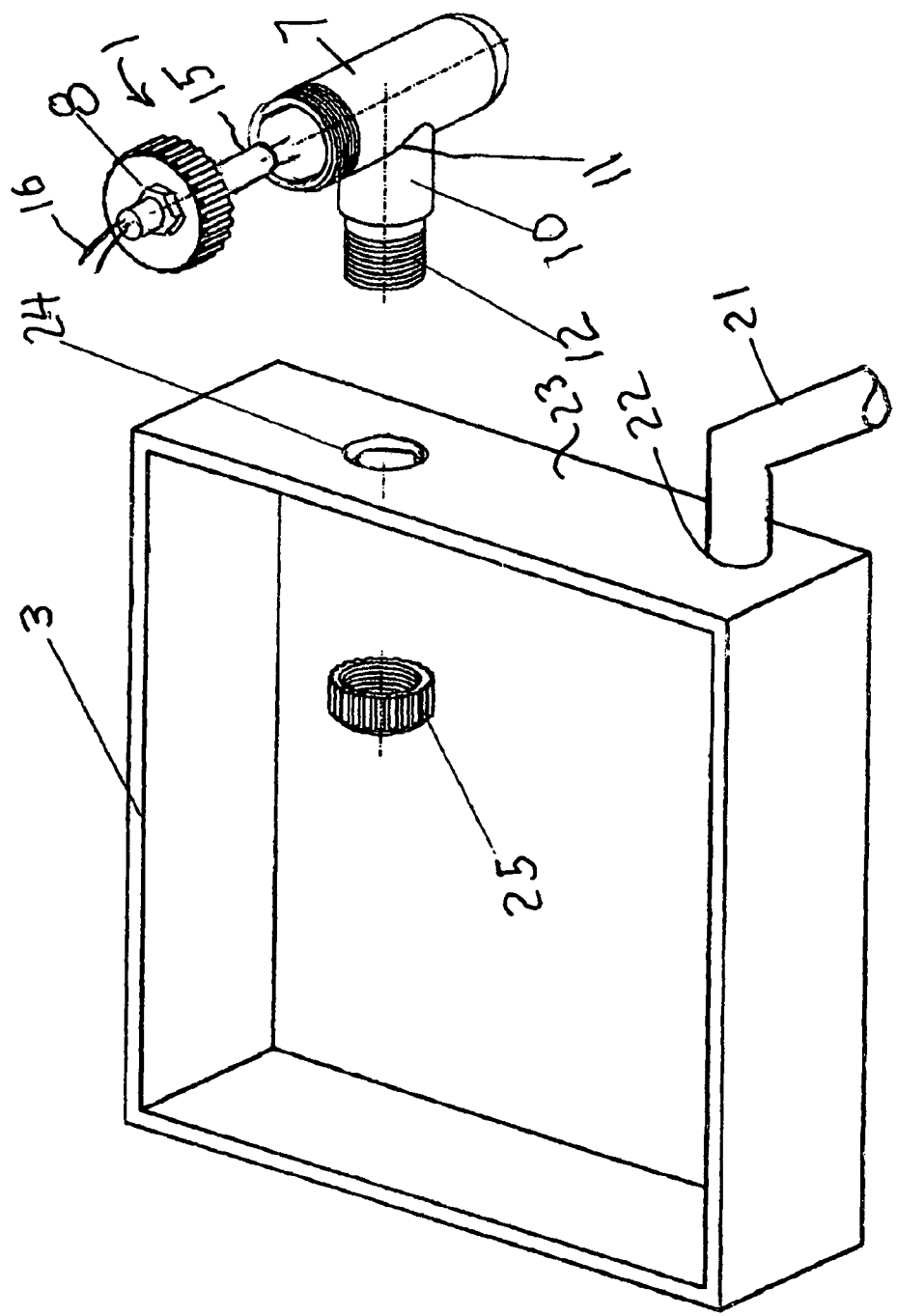
FIG. 3 is a partially exploded view of the invention of FIG. 1 in use.

Referring now first to the drawing FIGS. 1-3, apparatus 1 of the invention includes an elongate reservoir body 2 having a closed lower end 5, and an open upper end 4 with a removable top closure 8 that may be unscrewed to permit access to the central cavity 6 into which may be deposited one or more biocidal chemicals 20 (shown in phantom) of the type well known in the art for suppressing the growth of organisms in condensate water. The central cavity is enclosed by an encircling wall 7. A single aperture 9 in the wall 7 is operatively sealed to a first end 11 of a tubular member 10 to provide a passage for water to enter the cavity 6 and to exit the cavity. A second end 12 of the member 10 is constructed with connection means 25 for connecting to a condensate tray. There are no other apertures in wall 7.

As best seen in FIG. 3, a condensate tray 3 of the type installed beneath the evaporator coils of an air conditioner (not shown) receives water that condenses from the air passing over the chilling coils. Water that accumulates in the tray drains from the tray to the outside through a drain assembly 21 installed in an aperture 22 in the side wall 23 of the tray. Since condensate water drains very slowly and is stagnant at times, it tends to grow microorganisms that lead to clogging of the drain systems and then overflowing of the drain with damage. Some systems of the prior art apply biocidal chemicals directly to the tray in the form of slowly dissolving tablets. Direct access to the tray may be awkward in some installations. Other systems provide a flow through system in the drain containing slowly eluting chemicals. These do not apply chemicals to the tray where organisms can flourish. The apparatus 1 of the invention is not a flow through system. It admits chemicals to the tray from which they then drain through the drain pipes, thereby applying chemicals to all the components. The second end 12 of the tubular member 10 is operatively connected through a second aperture 24 in the wall 23 of the tray. This connection may be any means well known in the art. When the tray is constructed of a plastic, cemented slip joints generally used for the plastic piping may be used, for example. A threaded assembly is shown here for illustration purposes. As water in the tray increases, water flows from the tray (arrow 13) into the central cavity in a first mode of operation. When water in the tray falls below a preset level, water from the central cavity with chemicals dissolved therein flows into the tray (arrow 14) in a second mode of operation. Chemicals dissolved from the source 20 in the cavity will also diffuse into the tray when the level is constant and high enough to provide a fluid path between the cavity and the tray.

The closure 8 may optionally provide a fluid level sensor 15 consisting of two electrically isolated electrodes 17 that rest inside the central cavity when the closure is in place. The sensor provides a signal through wires 16 to inactivate electrically powered equipment such as an air handler and/or air conditioning compressor (not shown) when the liquid level in the central cavity reaches a preset level. The condensate water has the low conductivity properties of distilled water that would not activate this type of sensor. However, the chemicals 20 provide sufficient conductivity when dissolved in the water to operate the sensor.

Figure 4:
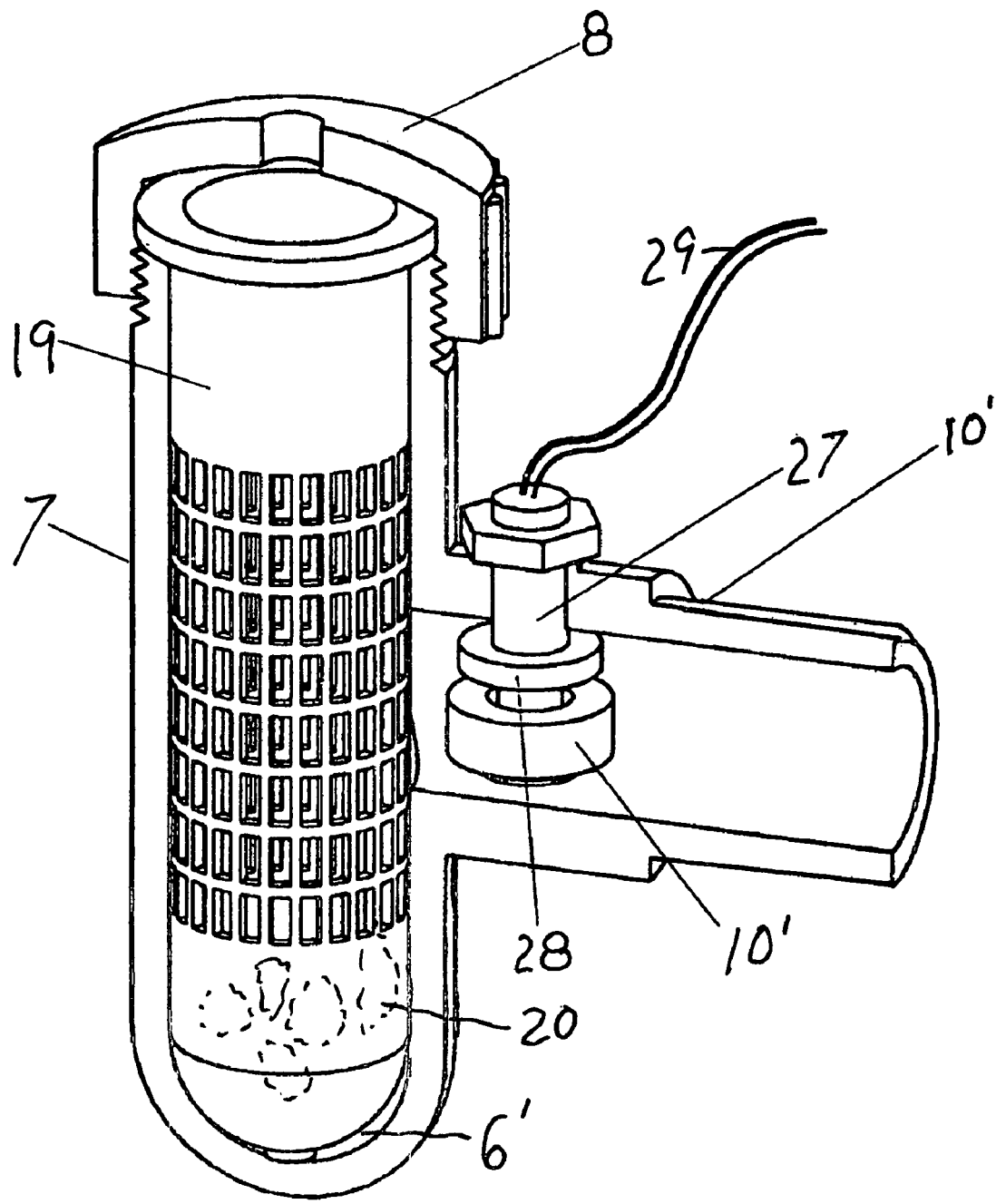
FIG. 4 is a sectional view of another embodiment of the invention.

Referring now to FIG. 4, an embodiment 26 of the invention is shown in which the central cavity 6' removably receives a perforated basket 19 containing the biocidal chemicals 20. A liquid level sensor 27 is optionally installed in the tubular member 10' to send a signal through signal wires 29 to inactivate electrically powered equipment when water level in the member is above a preset level. A float 28 carries a magnet to operate the sensor.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Apparatus for applying chemicals to water in an air conditioning condensate tray, the apparatus comprising:
   an elongate reservoir body having an open upper end, a closed lower end, and a central cavity enclosed by an encircling wall, the central cavity constructed to receive chemicals;
   a top closure removably connected to the upper end for closing the open upper end of the central cavity;
   no more than one aperture in the encircling wall;
   a tubular member operatively connected at a first end to the one aperture and having a second end extending outwardly therefrom;
   the second end constructed for receiving condensate water from the condensate tray for providing a fluid passage for the water to the central cavity in a first mode of operation when water in the condensate tray is above a preset level; and
   the second end further constructed for dispensing water from the central cavity in a second mode of operation with chemicals disposed in the water from contact within the central cavity when water in the condensate tray is below a preset level.

2. The apparatus according to claim 1 further comprising a fluid level sensor within the tubular member constructed to provide a signal to inactivate electrically powered equipment when water level in the member exceeds a preset level.

3. The apparatus according to claim 2 in which the fluid level sensor includes a float.

4. The apparatus according to claim 2 in which the fluid level sensor includes a pair of electrodes.

5. The apparatus of claim 1 further comprising a basket removably fitted within the central cavity for holding biocidal chemicals.

6. The apparatus according to claim 1 further comprising a fluid level sensor mounted in the top closure constructed to provide a signal to inactivate electrically powered equipment when water level in the central cavity exceeds a preset level.

7. The apparatus according to claim 6 in which the fluid level sensor includes a float.

8. The apparatus according to claim 6 in which the fluid level sensor includes a pair of electrodes.

9. The apparatus of claim 6 further comprising a basket removably fitted within the central cavity for holding biocidal chemicals.

10. Apparatus for applying chemicals to water in an air conditioning condensate tray, the apparatus comprising:
    an elongate reservoir body having an open upper end, a closed lower end, and a central cavity enclosed by an encircling wall, the central cavity constructed to receive chemicals;
    a top closure removably connected to the upper end for closing the open upper end of the central cavity;
    no more than one aperture in the encircling wall;
    a tubular member operatively connected at a first end to the one aperture and having a second end extending outwardly therefrom;
    the second end constructed for receiving condensate water from the condensate tray for providing a fluid passage for the water to the central cavity in a first mode of operation; and
    the second end further constructed for dispensing water from the central cavity in a second mode of operation with chemicals disposed in the water from contact within the central cavity.

11. The apparatus according to claim 10 further comprising a fluid level sensor within the tubular member constructed to provide a signal to inactivate electrically powered equipment when water level in the member exceeds a preset level.

12. The apparatus according to claim 11 in which the fluid level sensor includes a float.

13. The apparatus according to claim 11 in which the fluid level sensor includes a pair of electrodes.

14. The apparatus according to claim 10 further comprising a fluid level sensor mounted in the closure to sense water level within the central cavity constructed to provide a signal to inactivate electrically powered equipment when water level in the central cavity exceeds a preset level.

15. Apparatus for applying chemicals to water in an air conditioning condensate tray, the apparatus comprising:
    an elongate reservoir body having an open upper end, a closed lower end, and a central cavity enclosed by an encircling wall, the central cavity constructed to receive chemicals;
    a top closure removably connected to the upper end for closing the open upper end of the central cavity;
    a tubular member operatively connected at a first end to the encircling wall and having a second end extending horizontally therefrom;
    the second end constructed for receiving condensate water from the condensate tray for providing a fluid passage for the water to the central cavity in a first mode of operation; and
    the second end further constructed for dispensing water from the central cavity in a second mode of operation with chemicals disposed in the water from contact within the central cavity; and
    the tubular member providing the sole fluid passage through the encircling wall.

16. The apparatus according to claim 15 further comprising a fluid level sensor within the tubular member constructed to provide a signal to inactivate electrically powered equipment when water level in the member exceeds a preset level.

17. The apparatus according to claim 16 in which the fluid level sensor includes a float.

18. The apparatus according to claim 16 in which the fluid level sensor includes a pair of electrodes.

19. The apparatus according to claim 16 further comprising a fluid level sensor mounted in the closure to sense water level within the central cavity constructed to provide a signal to inactivate electrically powered equipment when water level in the central cavity exceeds a preset level.

* * * * *